(12) United States Patent
Aoki et al.

(10) Patent No.: US 7,914,409 B2
(45) Date of Patent: Mar. 29, 2011

(54) OIL-FREE CHAIN

(75) Inventors: Toshihiko Aoki, Osaka (JP); Hiroki Ishida, Osaka (JP); Takashi Nakagawa, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 445 days.

(21) Appl. No.: 12/102,215

(22) Filed: Apr. 14, 2008

(65) Prior Publication Data

US 2008/0287237 A1 Nov. 20, 2008

(30) Foreign Application Priority Data

May 15, 2007 (JP) ................. 2007-129569

(51) Int. Cl.
*F16G 13/04* (2006.01)
(52) U.S. Cl. ...................... 474/212; 474/215
(58) Field of Classification Search ............ 474/91, 474/231, 207, 212, 215
See application file for complete search history.

(56) References Cited

U.S. PATENT DOCUMENTS

| | | | | | |
|---|---|---|---|---|---|
| 2,906,562 | A | * | 9/1959 | Burgman | 305/104 |
| 3,336,089 | A | * | 8/1967 | Krickler | 305/118 |
| 4,729,756 | A | * | 3/1988 | Zimmer | 474/214 |
| 7,775,925 | B2 | * | 8/2010 | Nakagawa et al. | 474/231 |
| 2007/0129194 | A1 | * | 6/2007 | Wu | 474/230 |
| 2008/0076613 | A1 | | 3/2008 | Nakagawa et al. | |

FOREIGN PATENT DOCUMENTS

| | | |
|---|---|---|
| EP | 0 601 469 A1 | 6/1994 |
| JP | 51-162486 | 12/1976 |
| JP | 55-82210 | 6/1980 |
| JP | 57-181952 | 11/1982 |
| JP | 63-125842 | 5/1988 |
| JP | 64-030946 | 2/1989 |
| JP | 2001-071044 A | 3/2001 |
| JP | 2001-137961 A | 5/2001 |
| JP | 2001-304345 A | 10/2001 |
| JP | 2003-194227 A | 7/2003 |
| JP | 2004-256262 | 9/2004 |
| JP | 2005-282813 | 10/2005 |
| JP | 2005-282813 A | 10/2005 |
| TW | M290538 U | 5/2006 |

OTHER PUBLICATIONS

U.S. Appl. No. 11/978,404 by inventors Takashi Nakagawa et al., filed Oct. 29, 2007.

* cited by examiner

*Primary Examiner* — Emmanuel M Marcelo
(74) *Attorney, Agent, or Firm* — Howson & Howson LLP

(57) ABSTRACT

In an oil-free roller chain, the inner faces of the outer link plates have recesses that receive the ends of bushings, and the inner faces of the inner link plates have recesses that receive the ends of rollers surrounding the bushings. Each such recess is formed by punching, so that the outer surface of each plate has a bulged portion opposite each recess. The diameters of the bulged portions are greater than the diameters of the corresponding recesses. The bushing can have an oil passage located midway between its ends and serving as an oil reservoir supplying oil to the gap between the bushing and the roller and between the bushing and a connecting pin.

4 Claims, 6 Drawing Sheets

OIL-FREE CHAIN

CROSS-REFERENCE TO RELATED APPLICATION

This application claims priority on the basis of Japanese patent application 2007-129569, filed May 15, 2007. The disclosure of Japanese application 2007-129569 is hereby incorporated by reference.

FIELD OF THE INVENTION

The invention relates to an oil-free chain, also known as a "seal chain," for use in a conveyor for transferring articles, or for use as a power-transmitting roller chain or the like. The invention relates and more specifically to an oil-free chain comprising pairs of inner plates and pairs of outer plates in alternating, overlapping relationship along the length of the chain. In such a chain, a pair of bushings is provided for each pair of inner plates, and ends of the bushings are press-fit into bushing holes in the inner plates. A roller fits rotatably on each bushing. A pair of connecting pins is provided for each pair of outer plates, and the ends of the pins are press-fit into pin holes in the outer plates. Each pin extending through, and fits rotatably in, one of the bushings, and thereby connects the pairs of inner plates and pairs of outer plates in alternating, overlapping relationship.

In the oil-free chain, lubricating oil is sealed between the outer circumferential surfaces of the connecting pins and the inner circumferential surfaces of the bushings through which the connecting pins extend, and between the inner circumferential surfaces of the rollers and the outer circumferential surfaces of the bushings.

BACKGROUND OF THE INVENTION

In a known seal chain, described in Japanese Laid-Open Patent Publication No. 2004-256262, a rigid sealing ring is in contact with an axial end surface of the bushing, and an elastic sealing ring is compressed between the rigid ring and an outer link plate.

In another known seal chain, described in Japanese Laid-Open Patent Publication No. 2005-282813, lubricating oil is sealed between a bushing and a roller by seals comprising concave portions formed on an inside surfaces of the inner link plates and surrounding the ends of the roller. Ring-shaped seal plates are loosely fitted on both end portions of said roller, and an elastic ring is disposed between each concave portion and the adjacent seal plate.

In the seal chain of Japanese Patent Publication No. 2004-256262, compression of the elastic ring between the bushing and the outer link plate imposed resistance to bending of the chain. The resistance to bending of the chain can be reduced by surface finishing of the inside surfaces of the outer link plates and the end surfaces of the bushings that contact the rigid rings. However, surface finishing requires additional manufacturing steps that increase the cost of manufacture of the chain. In addition, since rigid rings are provided in addition to the elastic sealing rings, the number of chain parts is increased and assembly of the chain becomes more difficult and costly.

On the other hand, in the seal chain of Japanese Patent Publication No. 2005-282813, since a sealing ring and a seal plate are in a compressed state between a concave portion on an inside surface of an inner link plate and the roller, resistance to relative rotation of the roller and the inner link plate is increased, preventing the roller from rotating smoothly during operation of the chain. Here again, the problem of resistance to relative rotation can be addressed by surface finishing of the seal plates, the inside surfaces of the inner link plates, and the end surfaces of the rollers, but the surface finishing steps increase the cost and difficulty of manufacture. Moreover the provision of the seal plate and the sealing ring increases the number of parts, also making assembly difficult and increasing manufacturing cost.

Accordingly, the invention has one or more of the following objects. A first object of the invention is to solve the above-mentioned problems. Another object is to provide an oil-free chain which prevents leakage of lubricating oil sealed between a connecting pin and a bushing and between a roller and the bushing. Still another object is to prevent invasion of dust during operation of the chain, without reducing strength of the chain. Other objects of the invention include the reduction of sliding contact wear between an outer circumferential surface of the connecting pin and an inner circumferential surface of the bushing, suppression of sliding sounds, and avoidance of seizing of the outer circumferential surfaces of the bushings and the inner circumferential surfaces of the rollers. Finally, it is an object of the invention to provide a seal chain in which the number of parts is small, and which can be assembled and disassembled easily and at low cost.

SUMMARY OF THE INVENTION

The oil-free chain according to the invention comprises pairs of inner plates and pairs of outer plates in alternating, overlapping relationship along the length of the chain. A pair of bushings is provided for each pair of inner plates, and ends of the bushings are press-fit into bushing holes in the inner plates. A roller is rotatably fitted on each bushing. A pair of connecting pins is provided for each pair of outer plates, and ends of the pins are press-fit into pin holes in the outer plates, each pin extending through, and fitting rotatably in, one of the bushings, and thereby connecting the pairs of inner plates and pairs of outer plates in alternating, overlapping relationship. Lubricating oil is sealed between the outer circumferential surfaces of the connecting pins and the inner circumferential surfaces of the bushings through which the connecting pins extend, and between the outer circumferential surfaces of the bushings and the inner circumferential surfaces of the rollers.

Each bushing has end portions protruding from outside surfaces of the inner plates, and fitting into recesses formed in the inside surfaces of the outer plates. Each roller has end portions fitting into recesses formed in the inside surfaces of the inner plates. Each inner plate has a bulged portion coaxial with each recess in its inner surface and extending from its outer surface, and each outer plate has a bulged portion coaxial with each recess in its inner surface and extending from its outer surface.

In other words, the portions of the outer plates that have recesses to receive the ends of the bushings are offset in the direction of plate thickness, so that the outer plates have a stepped shape. The portions of the inner plates that have recesses to receive the ends of the rollers are similarly offset in the direction of plate thickness, so that the inner plates also have a stepped shape.

In a preferred embodiment, each bushing has an opening at an intermediate location between its ends and extending from its inner circumferential surface to its outer circumferential surface. The opening provides fluid communication from an oil space between the inner circumferential surface of the bushing and the outer circumferential surface of the connecting pin extending through the bushing to an oil space between the outer circumferential surface of the bushing and the inner circumferential surface of the roller rotatably fitted on the bushing. The opening contains oil and serves as an oil reservoir supplying oil to the oil spaces between the pin and the bushing and the roller, and between the bushing and the roller.

Preferably, each bulged portion of each outer plate has an outer diameter greater than the diameter of the recess with which it is coaxial in the same outer plate, and each bulged portion of each inner plate has an outer diameter greater than the diameter of the recess with which it is coaxial in the same inner plate.

The protrusion of the bushings into recesses in the outer plates forms a labyrinth structure which exhibits an oil-retention function, so that the leakage of lubricating oil from the space between the bushing and the connecting pin due to inertial force generated by circulating travel of the chain is suppressed. The labyrinth structure also suppresses invasion of the dust into the space between the bushing and the connecting pin. Thus, wear of the inner circumferential surface of the bushing and the outer circumferential surface of the connecting pin is reduced, and wear elongation of the chain can be prevented for a long period of time.

Similarly, the protrusion of the rollers into recesses in the inner plates forms a labyrinth structure which also exhibits an oil-retention function, so that the leakage of lubricating oil from the space between the bushing and the rollers due to inertial force generated by circulating travel of the chain is suppressed. This labyrinth structure also suppresses invasion of the dust into the space between the rollers and the bushings. Thus, wear damage and seizing of the inner circumferential surface of the roller and the outer circumferential surface of the bushing can be suppressed.

Since the bushing-receiving recess is formed as an offset portion of the outer link plate, in which the inside surface of the plate is recessed while the outside surface is bulged, the modulus of the outer plate is not reduced at the location of the recess. Thus, reduction in the strength of the outer plate is avoided. Moreover, the bushing-receiving recess can be formed by press-punching of the outer plate, and machining steps such as grinding and milling are not needed to form the bushing-receiving recess, and production is simplified.

Similarly, since the roller-receiving recess is formed as an offset portion of the inner link plate, in which the inside surface of the plate is recessed while the outside surface is bulged, the modulus of the inner plate is not reduced at the location of the recess. Thus, reduction in the strength of the inner plate is avoided. Moreover, the roller-receiving recess can be formed by press-punching of the inner plate, and machining steps such as grinding and milling are not needed to form the roller-receiving recess and production is simplified.

There is no seal compressed between the bushing and the outer link plate, and the chain can flex smoothly as it travels in a circulating path. There is also no seal compressed between the inside surface of the inner plate and an end surface of the roller. Consequently, the rolling resistance of the roller is small and the roller can engage smoothly with a sprocket during operation of the chain. Elimination of the compressed seals also reduces small and simplifies assembly and disassembly of the chain.

Further, whereas in a chain having compressed seals, special surface finishing steps are needed to reduce wear at the relatively sliding sealing surfaces, in the oil-free chain according to this invention, these special surface finishing steps are not needed, and the cost of production is therefore lower than in the case of a chain utilizing compressed seals.

When an oil reservoir in the form of a centrally located opening in the bushing is provided to allow fluid communication from the gap between the inner circumferential surface of the bushing and an outer circumferential surface of the connecting pin to the gap between an inner circumferential surface of the roller and an outer circumferential surface of the bushing in order to supply lubricating oil, a comparatively large amount of lubricating oil can be sealed within the chain and supplied continuously to the gap between the connecting pin and the bushing and to the gap between the bushing and the roller. Thus, sliding wear between the outer circumferential surface of the connecting pin and the inner circumferential surface of the bushing is reduced over a long period of time so that wear elongation of the chain can be more prevented, and sliding wear between the inner circumferential surface of the roller and the outer circumferential surface of the bushing can also be reduced for a long period of time, and sliding sounds and seizing can be prevented. Additionally, the roller can engage more smoothly with a sprocket and wear of the chain can be further reduced.

When the bulged portion opposite the bushing-receiving recess has an outer diameter larger than the diameter of the bushing-receiving recess, the modulus of the stepped portion of the outer plate can be at least as great, and even greater than, the modulus of the other parts of the outer plate. Thus, weakening of the plate and fatigue failure can be avoided. Similarly, when the bulged portion opposite the roller-receiving recess of the inner plate has an outer diameter larger than the diameter of the roller-receiving recess, the modulus of the stepped portion of the inner plate can be at least as great, and even greater than, the modulus of the other parts of the inner plate, and weakening of the inner plate and fatigue failure can be avoided.

DETAILED DESCRIPTION OF THE PREFERRED EMBODIMENTS

As stated previously, the roller chain of the invention is characterized by the fact that each of its bushings has end portions protruding from outside surfaces of the inner plates, and fitting into recesses formed in the inside surfaces of the outer plates. Furthermore, each roller has end portions fitting into recesses formed in the inside surfaces of the inner plates, each inner plate has a bulged portion coaxial with each recess in its inner surface and extending from its outer surface, and each outer plate has a bulged portion coaxial with each recess in its inner surface and extending from its outer surface. Preferably, the bulged portions are substantially cylindrical in shape.

Leakage of lubricating oil sealed between the connecting pins and the bushings and between the rollers and the bushings is avoided, and invasion of external dust is prevented. The avoidance of leakage and dust invasion is accomplished without reducing the strength of the chain, and sliding contact wear between the outer circumferential surfaces of the connecting pins and the inner circumferential surfaces of the bushings is suppressed as are and sliding sounds and seizing, generated between the outer circumferential surfaces of the bushings and the inner circumferential surfaces of the rollers. These effects are achieved with a minimum number of chain parts, and production, assembly and disassembly of the chain are simplified.

Figure 1:
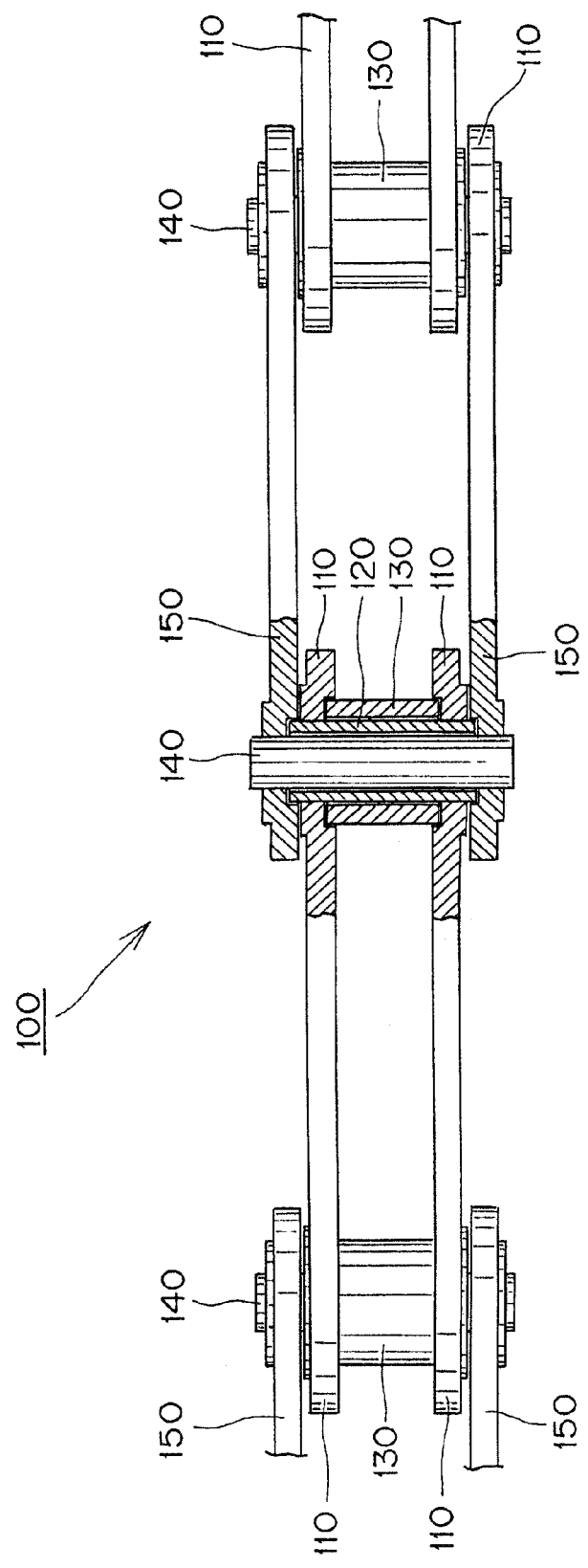
FIG. 1 is schematic plan view, partly in section, of a portion of an oil-free chain according to the invention.
Figure 2:
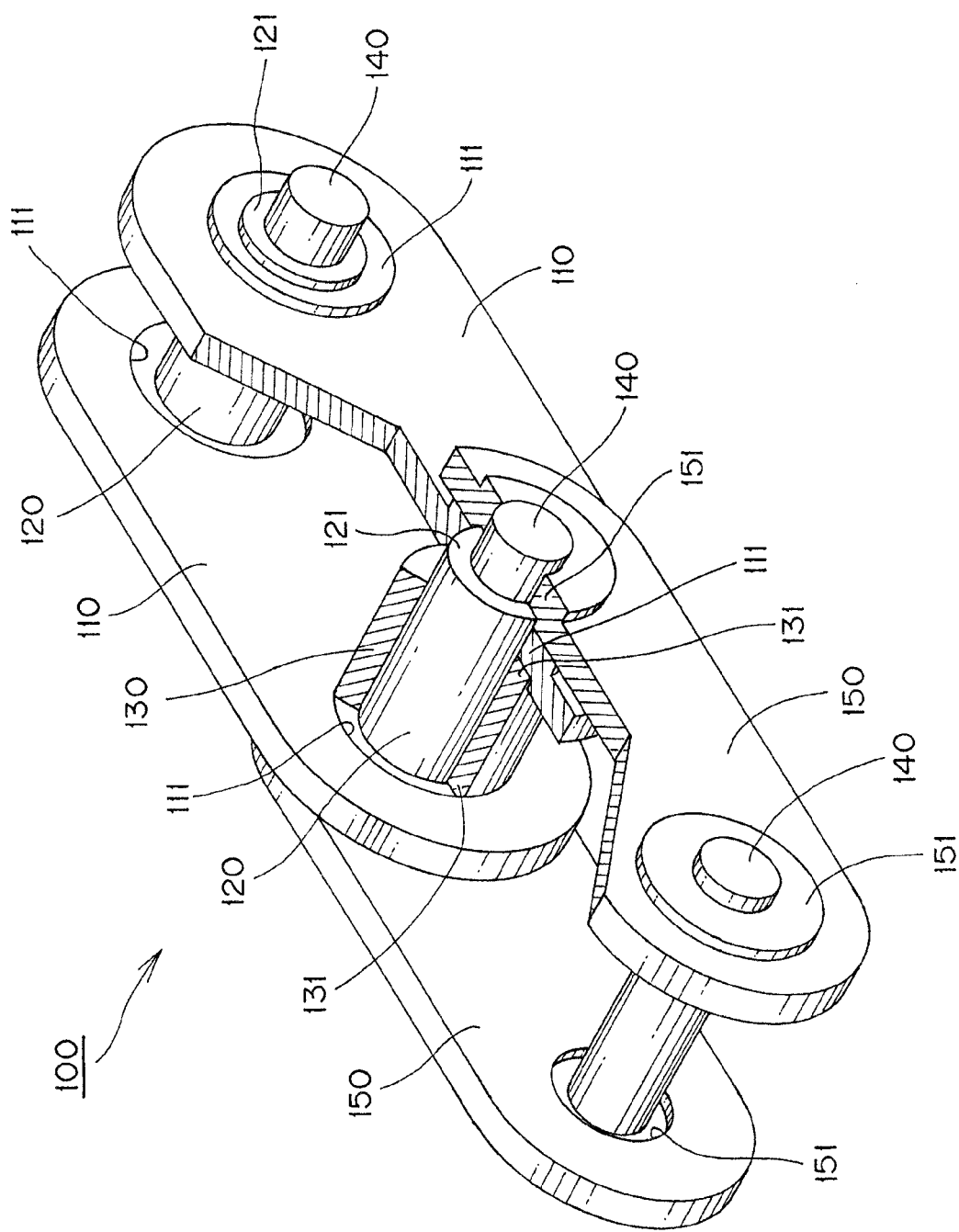
FIG. 2 is a partially cut-away perspective view of a portion of the chain, showing the manner in which the links of the chain are connected.
Figure 3:
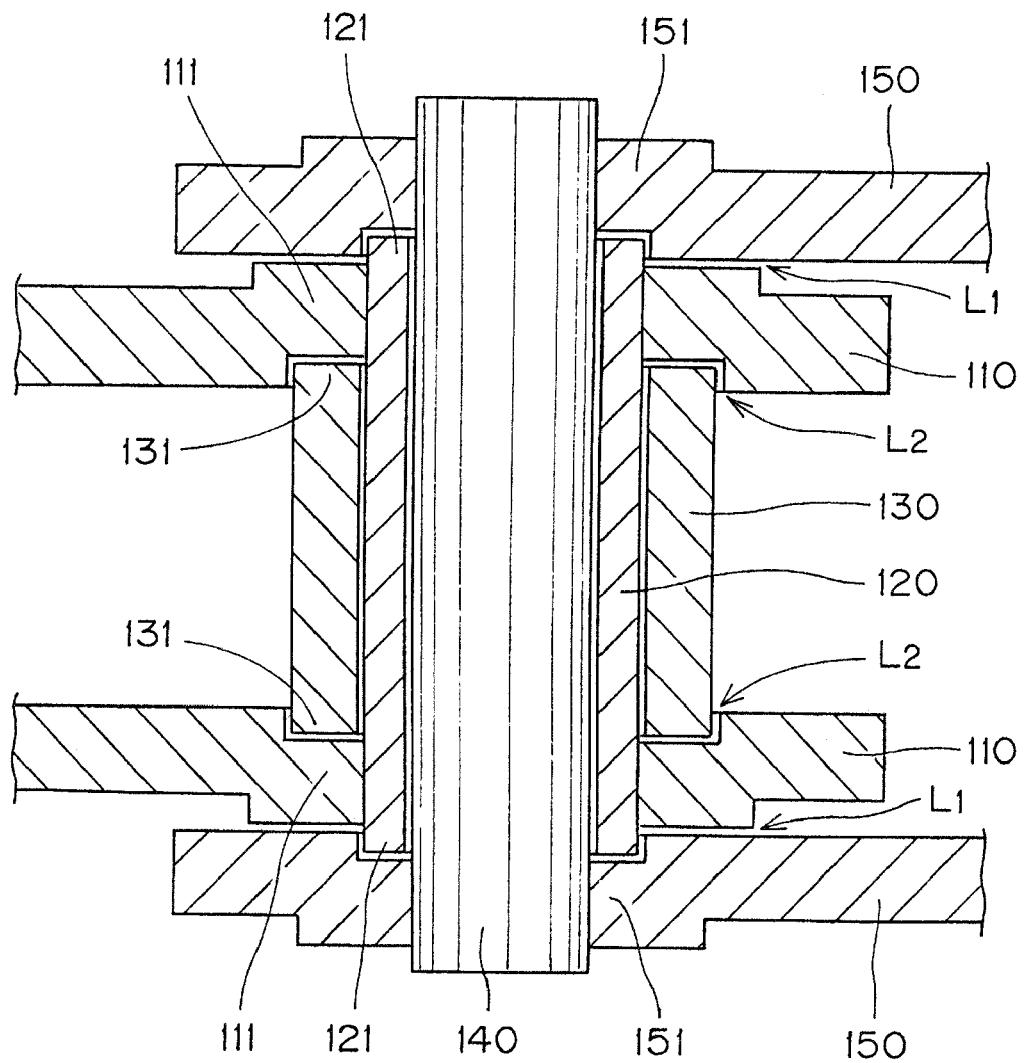
FIG. 3 is a cross-sectional view of the chain, showing details of the connecting pin, bushing, roller and inner and outer link plates.

As shown in FIGS. 1-3, an oil-free chain 100, according to a first embodiment of the invention, comprises a pair of opposed, laterally spaced, inner plates 110, and a pair of bushings 120 longitudinally spaced from each other and press-fit into holes formed in the inner plates 110. A roller 130 is rotatably fitted on each bushing 120, and longitudinally spaced connecting pins 140 extend through the bushings 120, and are press-fit into pin-holes formed in a outer plates 150, which are disposed in pairs in overlapping relationship with the inner plates 110. Because the pins extend through the bushings, the pairs of inner plates and the pairs of outer plates are interconnected in alternating, overlapping relationship.

Lubricating oil is sealed between the inner circumferential surface of each bushing 120 and the outer circumferential surface of the connecting pin 140 that extends through the bushing. Lubricating oil is also sealed between the inner circumferential surface of each roller 130 and the outer circumferential surface of a bushing 120 surrounded by the roller.

Figure 4:
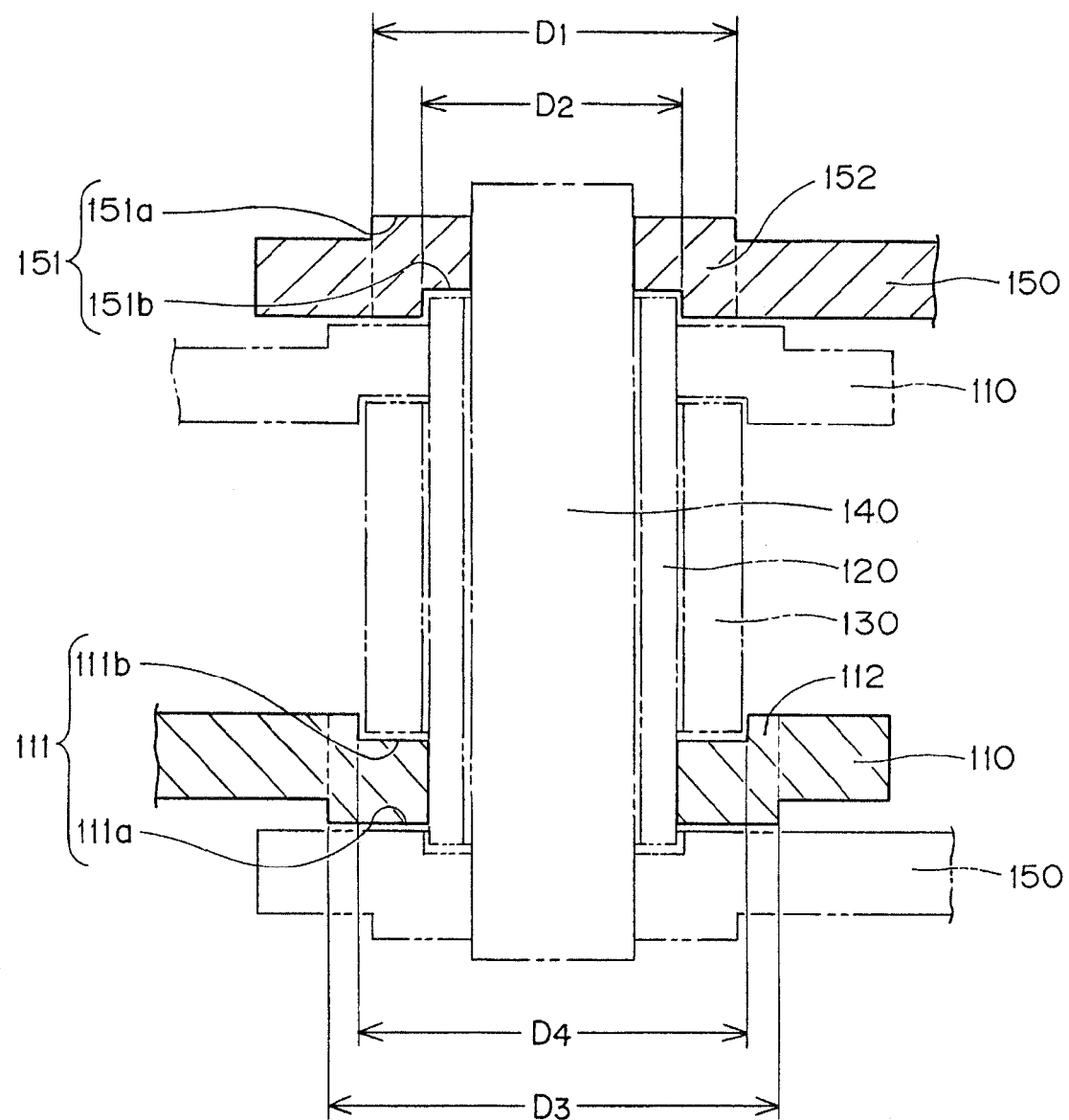
FIG. 4 is a schematic view illustrating the dimensional relationships of the recesses and bulged portions of the inner and outer link plates of the chain.

As shown in FIG. 3, bushing-receiving recesses 151b are formed in the inside surfaces of the outer plates 150, by forming offset portions 151 in the plates. Each offset portion 151 has a bulged portion 151a on the outer surface of the plate, the bulged portion 151a being coaxial with a corresponding recess 151b. As shown in FIG. 4, the bushing 120 surrounds a connecting pin 140, and the ends 121 (FIG. 2) of each bushing protrude beyond the inner plates 110 in which they are press-fit, and are received in annular spaces formed by the recesses in the outer plate and the connecting pin.

As shown in FIG. 3, similar recesses are formed on the inside surfaces of the inner plates 110 to receive end portions 131 of a roller 130. As in the case of the outer plates, the recesses in the inner plates are produced by forming an offset portion of the plate having a recess on the inside face and a corresponding bulge on the outer face, coaxial with the recess.

As shown in FIG. 4, the outer diameter D1 of the bulged portion 151a is greater than the inside diameter D2 of the recess 151b. The modulus of the section of the stepped portion 152 of the outer plate 150 is greater than the modulus of the section of the other portions of plate 150.

Similarly, as shown in FIG. 4, the outer diameter D3 of the bulged portion 111a is greater than the inside diameter D4 of recess 111b, and the modulus of the section of the stepped portion 112 of the inner plate 110 is greater than the modulus of section of the other portions of plate 110.

The end portions 121 of the bushing, that protrude from outside surfaces of the inner plates 110 extend into the recesses 151b, and a labyrinthine lubricating oil leakage passage is formed between end portion 121 of the bushing and the recess. The labyrinthine passage exhibits an oil-retention function, so that the leakage of lubricating oil sealed between the bushing 120 and the connecting pin 140 due to inertial forces generated during travel of the chain is suppressed, and invasion of the external dust is also suppressed. As a result, wear damage to the inner circumferential surface of the bushing 120 and to the outer circumferential surface of the connecting pin 140 is reduced and wear elongation of the chain can be prevented for a long period of time.

The end portions 131 (FIG. 2) of the roller 130 respectively fit into recesses 111b, forming a labyrinthine lubricating oil leakage passage between the roller end portion 131 and the recess 111b, which exhibits an oil-retention function so that the leakage of lubricating oil sealed between the roller 130 and the bushing 120 due to inertial forces is suppressed and invasion of the external dust is also suppressed. Thus, the wear damage and seizing of the inner circumferential surface of the roller 130 and the outer circumferential surface of the bushing 120 can be suppressed.

Since the modulus of section of the stepped portion 151 is at least as great as the modulus of section of the other portions of outer plate 150, reduction in strength of the outer plate due to the formation of the bushing-receiving recess is avoided. Furthermore the recess 151b and the corresponding bulged portion 151a can be formed at the same time by press-punching of the outer plate 150 using a metal mold. Thus, machining such as grinding and milling is not needed and the cost of production can be kept at a low level. The recess 111b in the inner plate 110 is formed similarly, and, since the modulus of section of the stepped portion 111 is at least as great as the modulus of section of other portions of plate 110 reduction in strength of the inner plate 110 due to the formation of the roller-receiving recess is avoided. The stepped portion in plate 110 is also preferably formed by press punching, using a metal mold, thereby avoiding more expensive and time-consuming machining steps such as grinding and milling.

Since there is no seal member compressed between the bushing and the outer link plates, the chain can flex smoothly as it travel in a circulating path. Avoidance of the seal member also reduces the number of chain parts. Furthermore, since there is no seal member compressed between the inside surface of the inner plate and the end of the roller, the rolling resistance of the roller 130 is small and the roller 130 can roll smoothly on the bushing, and engages smoothly with a sprocket during operation of the chain. The avoidance of a seal member between the bushing and the outer link plate also reduces the number of chain parts, and makes assembly and disassembly, easy and inexpensive.

Because surface finishing to reduce the roughness of the outside surface of the inner plate, the inside surface of the outer link plate, the inside surface of the inner link plate, and the end surface of the roller is not needed, the cost of production of the oil-free chain can be reduced significantly.

Furthermore, because the outer diameter D1 of the bulged portion 151a is greater than the inner diameter D2 of the corresponding recess 151b, the modulus of section of the stepped portion 152 of the outer plate 150 becomes larger than the modulus of section of the other portions of the plate, and the strength of the stepped portion 152, where fatigue failure is liable to occur, is improved. similarly, when the outer diameter D3 of the bulged portion 111a of the inner plate is greater than the inner diameter D4 of the recess 111b, the modulus of section of the stepped portion 112 of the inner plate 110 becomes larger than the modulus of section of the other portions of plate 110, and strength of the stepped portion 112, where fatigue failure is liable to occur, is improved.

Figure 5:
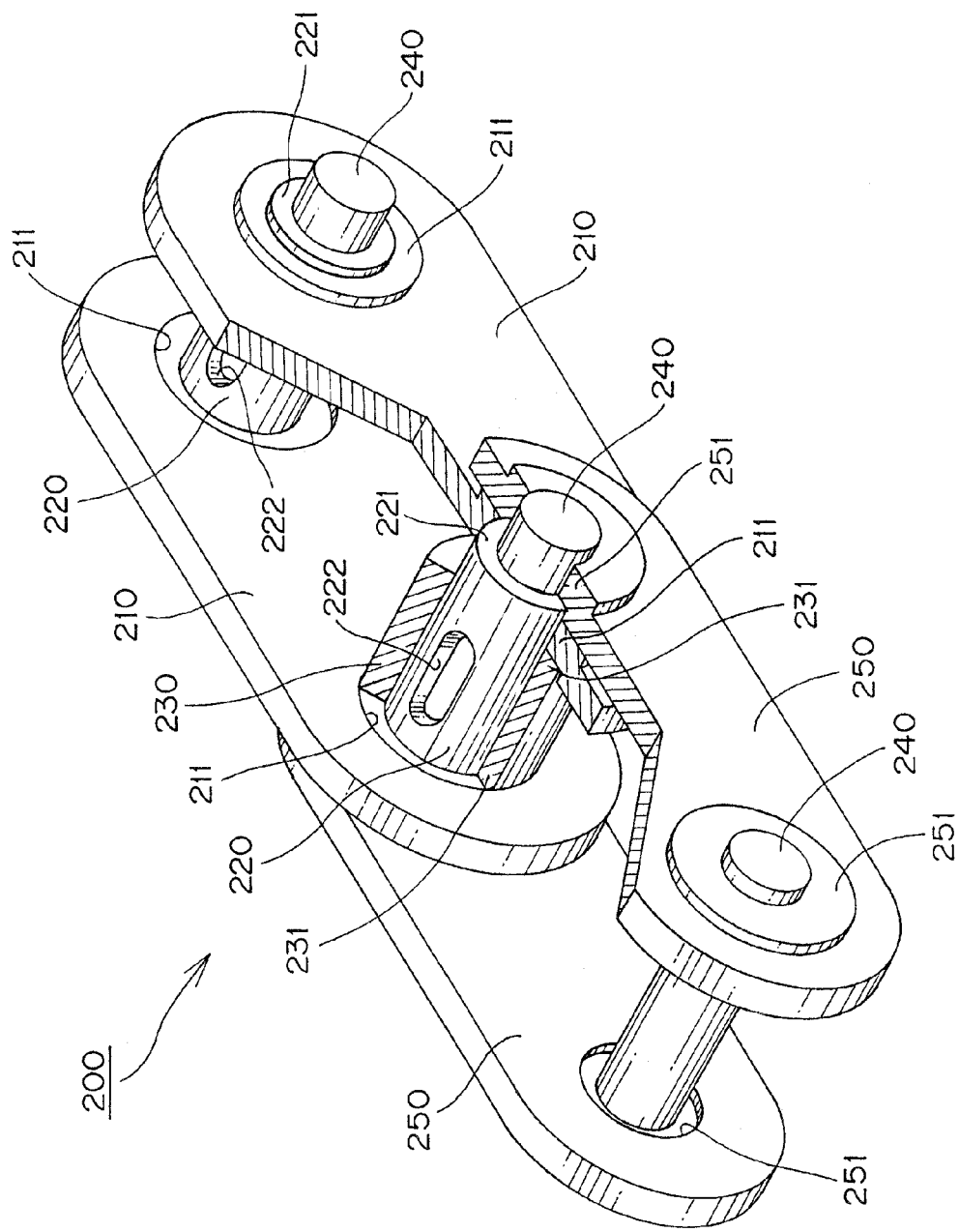
FIG. 5 is a partially cut-away perspective view, corresponding to FIG. 2, of a portion of an alternative embodiment of the chain, having an oil reservoir formed in the bushing.
Figure 6:
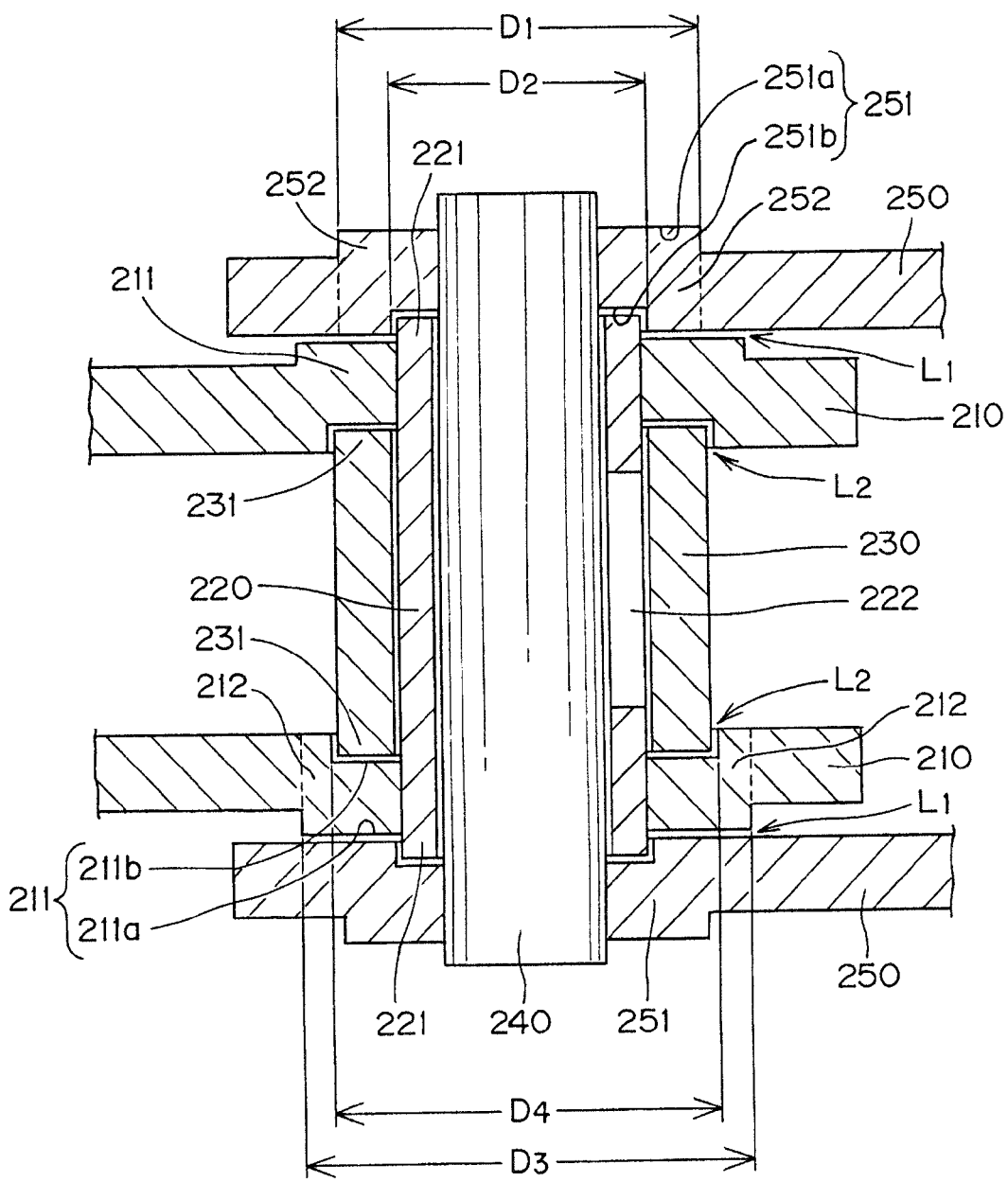
FIG. 6 is a cross-sectional view of the chain of FIG. 5.

As shown in FIGS. 5 and 6, in an oil-free chain 200, according to a second embodiment of the invention, parts that correspond to those of the first embodiment are identified by reference numbers that exceed by 100 the corresponding parts in FIGS. 2 and 3. The plates, connecting pins, and rollers, and the relationship of the plates to the connecting pins, bushings and rollers are the same as in the first embodiment. For example, the protruding ends of the bushing are received in recesses formed in the inner surfaces of the outer plates, the ends of the roller are received in recesses in the inner surfaces of the inner plates, and the inner and outer plates have bulged portions on their outer surfaces that are coaxial with their corresponding recesses. The chain of the second embodiment exhibits all of the advantages of the chain of the first embodiment.

Lubricating oil is sealed between the inner circumferential surface of the bushing 220 and the outer circumferential surface of the connecting pin 240, and also between the inner circumferential surface of the roller 230 and the outer circumferential surface of the bushing 220. However, a passage 222, which is formed in the bushing at an intermediate location between the ends of the bushing 220, provides fluid communication from a gap between the inner circumferential surface of the bushing 220 and the outer circumferential surface of the connecting pin 240 to a gap between the inner circumferential surface of the roller and the outer circumferential surface of the bushing 220. This passage 222 serves as an oil reservoir, and supplies lubricating oil to both gaps.

In the embodiment shown in FIGS. 5 and 6, more lubricating oil can be sealed within the chain, and the oil is supplied continuously to the gap between the connecting pin 240 and the bushing 220 and to the gap between the bushing and the roller. Thus sliding wear between the outer circumferential surface of the connecting pin 240 and the inner circumferential surface of the bushing 220 can be reduced over a longer period of time for prevention of wear elongation of the chain, and sliding wear between the inner circumferential surface of the roller 230 and the outer circumferential surface of the bushing 220 can be reduced for a longer period of time. Sliding sounds and seizing, which are generated between the roller 230 and bushing 220, can also be prevented for a longer period of time, and the roller 230 can engage smoothly with a sprocket for a longer period of time so that the rate of wear of the chain can be further reduced.

Various modifications can be made to the embodiments described. For example, the bushing-receiving recesses can be circular, but can have various other shapes including a polygonal shape. Likewise, the protruding end portion of the bushings can have circular, polygonal or other shapes.

The end portions of the rollers can likewise have various shapes, and can have diameters smaller than the diameters of the sprocket-contacting portions of the rollers. When an oil retaining groove is provided as a passage extending from the inner circumferential surface of the bushing to its outer circumferential surface, a relatively large amount of lubricating oil can be sealed in the chain and sliding wear can be reduced over a long period of time, thereby reducing wear elongation of the chain.

Furthermore, when the inside surface of the outer plate and the outside surface of the inner plate have rough surfaces can form an oil-retaining labyrinth structure having an improved sealing effect, preventing leakage of lubricating oil and at the same time preventing invasion of dust from the outside.

Likewise, when the inside surfaces of the inner plates and an end surfaces of the rollers have rough surfaces which closely face each other, a labyrinth structure is formed which exhibits a sealing effect, preventing leakage of lubricating oil from the gap between the roller and the bushing and preventing invasion of dust.

The rollers can be made from various materials having wear resistance and impact resistance, including tool steel, stainless steel, rubber, engineering plastic (known as "ENPLA"), and the like. Especially when tool steel is utilized, wear damage due to sliding contact can be minimized.

These and numerous other modifications can be made without departing from the scope of the invention as defined by the following claims.

What is claimed is:

1. An oil-free chain comprising:
    pairs of inner plates and pairs of outer plates in alternating, overlapping relationship along the length of the chain, said inner plates having outside surfaces and inside surfaces and said outer plates having outside surfaces and inside surfaces;
    a pair of bushings for each pair of inner plates, ends of the bushings being press-fit into bushing holes in the inner plates, and each bushing having inner and outer circumferential surfaces;
    a roller rotatably fitted on each of said bushings, each roller having an inner circumferential surface; and
    a pair of connecting pins for each pair of outer plates, ends of the pins being press-fit into pin holes in the outer plates, each pin having an outer circumferential surface and extending through, and fitting rotatably in, one of said bushings, and connecting the pairs of inner plates and pairs of outer plates in said alternating overlapping relationship;
    wherein lubricating oil is sealed between the outer circumferential surfaces of the connecting pins and the inner circumferential surfaces of the bushings through which the connecting pins extend, and between the outer circumferential surfaces of the bushings and the inner circumferential surfaces of the rollers;
    wherein each said bushing has end portions protruding from outside surfaces of said inner plates, and fitting into recesses formed in the inside surfaces of said outer plates;
    wherein each said roller has end portions fitting into recesses formed in the inside surfaces of said inner plates;
    wherein each said inner plate has a bulged portion coaxial with each said recess in its inner surface and extending from its outer surface; and
    wherein each said outer plate has a bulged portion coaxial with each said recess in its inner surface and extending from its outer surface.

2. An oil-free chain according to claim 1, in which each bulged portion of each outer plate has an outer diameter greater than the diameter of the recess with which it is coaxial in the same outer plate, and in which each bulged portion of each inner plate has an outer diameter greater than the diameter of the recess with which it is coaxial in the same inner plate.

3. An oil-free chain according to claim 1, in which each of said bushings has an opening at an intermediate location between its ends and extending from its inner circumferential surface to its outer circumferential surface, the opening providing fluid communication from an oil space between the inner circumferential surface of the bushing and the outer circumferential surface of the connecting pin extending through the bushing to an oil space between the outer circumferential surface of the bushing and the inner circumferential surface of the roller rotatably fitted on the bushing, said opening containing oil and serving as an oil reservoir supplying oil to said oil spaces.

4. An oil-free chain according to claim 3, in which each bulged portion of each outer plate has an outer diameter greater than the diameter of the recess with which it is coaxial in the same outer plate, and in which each bulged portion of each inner plate has an outer diameter greater than the diameter of the recess with which it is coaxial in the same inner plate.

* * * * *